United States Patent [19]

Earle

[11] Patent Number: 4,896,075

[45] Date of Patent: Jan. 23, 1990

[54] AUTOMATIC HEADLIGHT AND PARKING LIGHT SWITCHING

[76] Inventor: John L. Earle, P.O. Box 185, Forest Grove, Oreg. 97116

[21] Appl. No.: 169,173

[22] Filed: Mar. 21, 1988

Related U.S. Application Data

[63] Continuation of Ser. No. 826,093, Feb. 6, 1986, abandoned.

[51] Int. Cl.$^4$ .......................... H01K 7/00; B60Q 1/26; B60Q 1/02
[52] U.S. Cl. ........................................ 315/82; 315/76; 315/77; 315/80; 315/83
[58] Field of Search ............................................ 315/83

[56] References Cited

U.S. PATENT DOCUMENTS

3,373,312 3/1968 Conn ..................................... 315/83
3,389,296 6/1968 Carruth ................................. 315/82
3,544,838 6/1968 Carruth et al. ....................... 315/83
4,301,390 11/1981 Earle ..................................... 315/83

Primary Examiner—Eugene R. LaRoche
Assistant Examiner—Thanh-Truc Nguyen
Attorney, Agent, or Firm—James Creighton Wray

[57] ABSTRACT

Turning on either headlights or parking lights pulses a first control circuit and energizes a relay, closing normally open contacts in the light circuits. The closing of the contacts energizes a second control circuit which holds the relay on and supplies power to timers. Turning off an ignition switch starts a short headlight timer and a long parking light timer. The timers have outputs connected to disable the second control circuit and to thereby de-energize the relay. The output of the short timer is grounded through the headlights when the headlights are in a low resistance off condition.

29 Claims, 6 Drawing Sheets

AUTOMATIC HEADLIGHT AND PARKING LIGHT SWITCHING

BACKGROUND OF THE INVENTION

This invention relates to delayed turning off of automobile lights. The new automatic headlight switch circuit described herein adds a parking light provision, which U.S. Pat. No. 4,301,390 did not have. There are other changes as well. One basic concept is the same. The lights come on only when the operator physically moves the light switch from the off to the on position. That is, if the switch has been left in the "on" position at night and the next morning the operator turns on the ignition, the lights will not come on unless the operator recognizes the need for lights in which case he reaches for the light switch. Finding it already on, the operator realizes that somebody forgot it. Turning it off and then on again rekindles the lights. Had the switch not been left on, it would always turn on the lights when moved on in the normal manner. That was done before in U.S. Pat. No. 4,301,390 but in a different way.

In the prior patent, the series interuption from the added relay went in the power source line to the headlight switch before it split into the headlight and parking light circuits. Most cars today have separate fusing after the switch. The prior patent did not have separate provision to handle the parking lights. In addition, there was always some residual current flowing in the older circuit to keep it alive at all times.

The parking light problem has not been adequately treated, as far as is known, by any other device. A person may want more than a minute of parking light. Shutting parking lights off after a minute would be undesirable in some situations if an ignition key were not available.

A common approach to prevent forgetting headlights, while still keeping the normal function of the headlights without a key, is to provide a buzzer or other audible device to alert the operator that the key is out and the lights are on. However, buzzers or chimes are often a greater nuisance than anything. Some people build up a mental block to the noise of the alerts. Talking cars avoid simple noisemakers, but some voices are obnoxious as well, and any voice can sometimes be obnoxious. A busy driver would rather just not worry about forgetting lights.

SUMMARY OF THE INVENTION

The present invention provides different delays for turning off headlights and parking lights. The new system derives all of its "overhead" operating currents through the switch and fuse circuits, so that when the light switch is manually off, there is virtually no current flow in the automatic device. In addition, parts count and cost is reduced over the system described before in U.S. Pat. No. 4,301,390.

Two distinct times of one minute for headlights and one hour for parking lights is a practical time that most people can remember. Few people forget their parking lights alone anyway, so the additional battery drain of the parking lights for an hour can be tolerated in most cases by most batteries and they will be fully recharged in about 10 minutes of driving after an hour of parking light drain with no engine running. The parking lights typically take 6 amps and the headlights take 8 to 10 amps. A typical 60 amp hour battery would thus lose only 10% of charge from an hour of parking lights.

That is an adequate treatment since few people really know how long they can leave their lights on without a problem. Most people recognize that headlights will drain the battery in a matter of hours. Many think parking lights can be left on indefinitely, but that is not true.

The present automatic device allows a driver to forget about turning off lights with a minimum change in the normal operation of the headlight/parking light scheme.

This invention provides a unit that can be installed easily in new systems and that can be retrofitted easily into existing cars. Installation requires cutting the series connection between the fuses and the light wires. Cutting wires and splicing with automotive connectors is not difficult.

Turning on either headlights or parking lights energizes a relay to close normally open contacts in both headlight and parking light circuits. Closing of the contacts energizes a second control circuit which holds the relay on. Turning off an ignition switch starts short and long timers having outputs connected to disable the second control circuit and to thereby de-energize the relay. The output of the short timer is connected to the headlight circuit so that it grounds the short timer output when the headlights are in a low resistance off condition.

A preferred automatic light switching apparatus has normally open contacts in a light circuit. A relay is connected for closing the normally open contacts. Energizing means for and first controlling means are electrically connected to the relay and to one of the contacts for providing a power pulse to control energizing of and close the contacts. Second controlling means is connected to the other contact for and maintaining the relay energized and the contacts closed when power is supplied across the contacts. Disabling means is electrically connected to the second controlling means for disabling the second controlling means and the energizing means.

Relay energizing means is described herein in a broad sense as either flowing current through a relay or controlling flow of current through a relay.

The preferred disabling means is a timer for disabling the energizing means.

Preferably, the disabling means is a grounding means connected to the timer for bypassing a part of the energizing means.

In one preferred embodiment, the energizing means has a transistor connected in series to the relay for completing a power circuit from the first contact. A capacitor and resistors connected in series to each other and connected to the base of the transistor bias the transistor "ON".

The preferred second energizing circuit comprises a resistors connected between the second contact and ground and connected to a base of the transistor for biasing the transistor "ON".

Preferably, the disabling means comprises a second transistor having power terminals connected to a base of the first transistor and to ground for disabling the on biasing of the first transistor.

In a preferred embodiment, the disabling means further comprises a timer having an output connected to a base of the second transistor for biasing the second transistor "ON" when the timer output reaches a high level.

Preferably, the timer has an input, an oscillator connected to the input, and an accumulator connected to the oscillator and connected to the output for changing the output from a low state to a high state after a number of oscillations.

The preferred embodiment has a parking light circuit and a second set of normally open contacts in the parking light circuit. Means for closing the second set of contacts is connected to the relay. A first contact in the second set is connected to the first energizing circuit. A second connection extends from the second contact to the second controlling circuit. A second timer is connected to the disabling means for disabling the energizing means after a second, longer time interval. A first timer disabling means is connected to the first timer output and to the headlight circuit for disabling the first timer output when the headlights are off.

The preferred first timer produces a high output about one minute after the oscillator begins. The second timer output becomes high about one hour after the oscillator begins.

Preferably, the timer disabling means comprises a circuit having a diode connected between the output of the first timer and the headlights for grounding the output of the first timer through the relatively low resistance of the headlights in the off condition.

In preferred embodiments, diodes in the first and second connections and diodes in the first and second controlling circuits cooperate for preventing current flow between the headlight circuit and the parking light circuit.

A preferred method of switching headlights comprises supplying power to a relay energizing circuit upon closing of a headlight switch, charging a capacitor and creating a control voltage and completing a relay energizing circuit, and closing normally open contacts in the headlight circuit with a relay.

The preferred method further comprises controlling the relay energizing circuit with current from the headlight circuit between the closed normally open contacts and the headlights.

The preferred method further comprises disabling the controlling and interrupting a circuit through the relay, thereby releasing the relay and opening the normally open contacts.

The preferred method further comprises controlling the disabling with an output of a timer.

Preferably, the timer is started when an ignition switch is turned off.

In the preferred method the timer is operated with current from the headlight circuit.

The preferred method further comprises closing normally open contacts in a parking light circuit with a relay, energizing the relay, and controlling the relay from connections to the headlight and parking light circuits between the headlight and parking light switches and the contacts, and controlling the relay energizing circuit with connections to the headlight circuit and to the parking light circuit between the normally open contacts and the lights.

The preferred method further comprises starting a second timer when the ignition switch is off. The preferred disabling comprises disabling the controlling and interrupting the relay circuit with outputs from the first and second timer.

In the preferred method the first timer is disabled when the headlights are off.

The preferred method of disabling the first timer comprises connecting output of the first timer to the headlight circuit and thus grounding the output of the first timer through low resistance of the headlights in an off position.

These and further objects and features of the invention are apparent in the disclosure, which is the above and ongoing specification including the claims and the drawings.

BRIEF DESCRIPTION OF THE DRAWINGS

FIG. 2 shows a simplified schematic diagram of a circuit for maintaining headlights on.

FIG. 3 is a simplified schematic diagram of the system shown in FIG. 2 with timer means and circuits to disable the system which holds the headlights on.

DETAILED DESCRIPTION OF THE DRAWINGS

Figure 1:
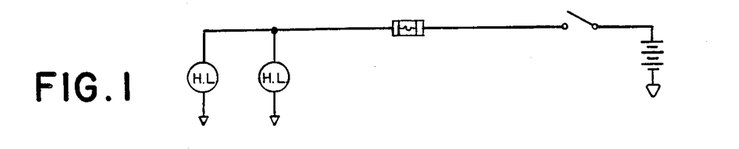
FIG. 1 shows a basic headlight circuit with an on/off switch, a fuse and headlights.

FIG. 1 shows a simplified headlight circuit already existing in automobiles. In the new system shown in FIG. 2, normally open contacts, $S_3$ and $S_4$, are inserted in a switched and fused power line going to the headlight. With headlight switch 4 open, no power is applied to the fuse 6, and no power gets to the inserted circuit 8 or headlights 2. Upon closing of headlight switch 4, power is sent through the fuse 6 to relay contact $S_4$, which initially does nothing. Power is applied to the top of the relay coil 10 and to the top of the capacitor $C_1$.

Figure 2:
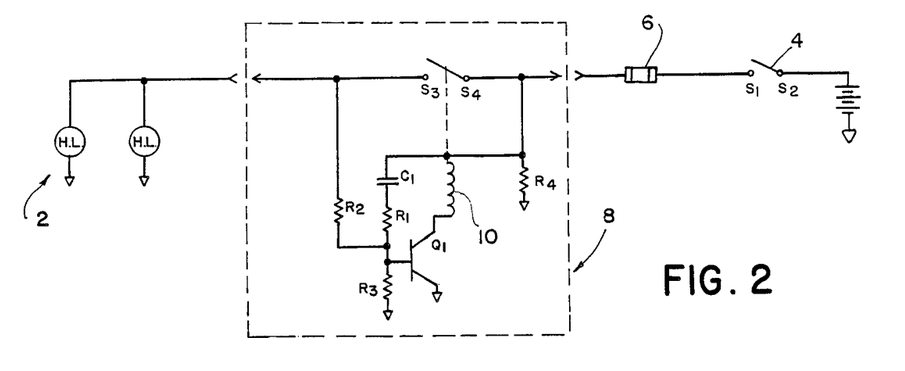

Since the capacitor initially had no charge, it suddenly brings the top of resistor $R_1$ up to $+12$ volts at the time of closing headlight switch 4. This causes a transient current to flow through $C_1$, $R_1$, and the base-emitter junction of $Q_1$, which turns on $Q_1$ for a fraction of a second, which is long enough for the current now flowing in the relay coil 10 to cause the relay to close contacts $S_3$ and $S_4$.

With $S_3$ connected to $S_4$, current can now flow through a d.c. path through $R_2$ to energize the $Q_1$ base-emitter junction and thus to energize the relay, to keep the relay on even after the current flow through the capacitor has ceased when it gets fully charged. With $S_3$ and $S_4$ closed, current flows to the headlights also.

Turning off the headlight switch obviously causes the relay to fall out, disconnecting the headlights redundantly.

Figure 3:
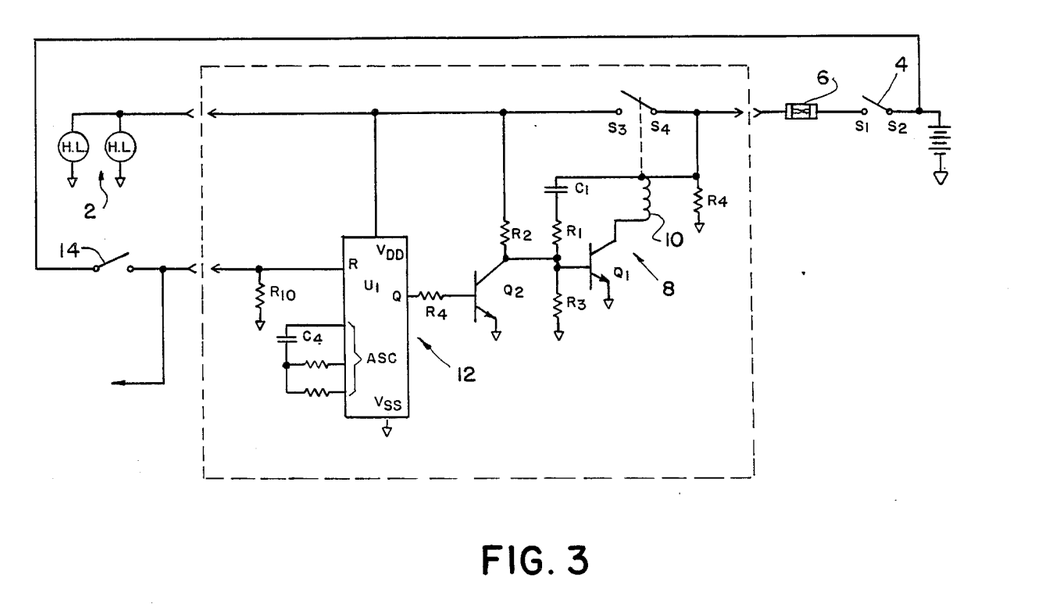

The basics of how the system turns on and passes current through the relay are covered in FIG. 2. FIG. 3 is a slightly more complicated diagram, with the addition of the circuitry 12 which automatically shuts off the lights when the ignition 14 is off and timer $U_1$ runs out of time, enabling transistor $Q_2$ to turn on, which then shunts the current flowing through $R_2$, so that $Q_1$ turns off and the relay opens.

$U_1$ can be configured out of discrete components, individual functional blocks, such as several integrated circuits, or as one multifunction integrated circuit as shown. The integrated circuit actually used is the RCA COSMOS type CD4060, which is a timer consisting of an oscillator portion, a counter portion and a resetting input R. The oscillator portion oscillates at some relatively low frequency (in this case), which then clocks a counter, which provides an output at Q after a relatively long period of time when sufficient clock pulses have advanced the digital counter so that the Q output goes to a logical 1, which is a high state in this case.

If the ignition switch 14 is on, then it applies a high (logical 1) to the reset input R of the timer $U_1$, which keeps it from counting. Thus, Q stays low (logical zero) until the prescribed time period after the reset is removed by turning off the ignition switch, which allows $R_{10}$ to pull the reset to a low, which removes the reset and allows the counter to count.

Figure 4:
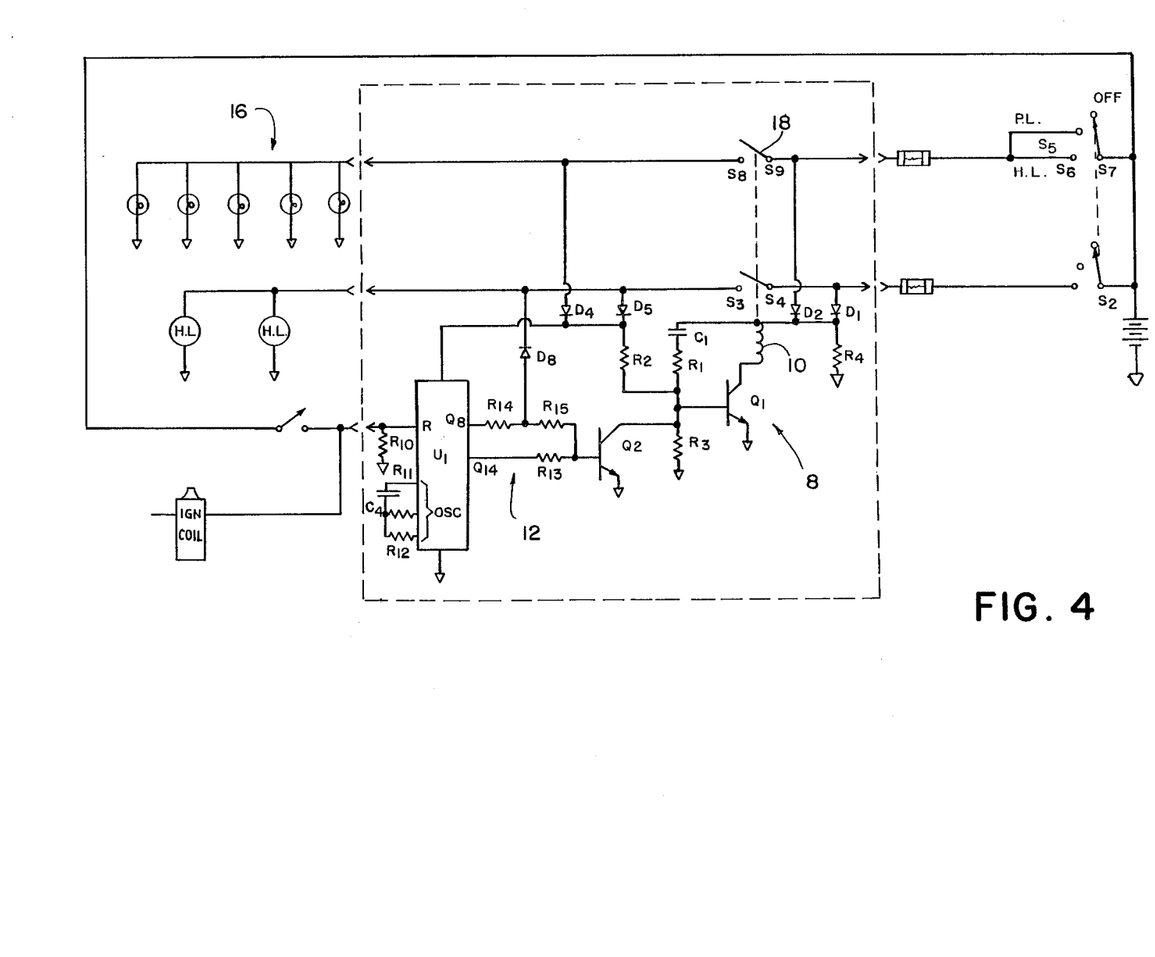
FIG. 4 is a schematic circuit diagram of a system similar to FIG. 3 with the addition of a parking light circuit and connections to the relay and control circuits and an additional timer output and a first timer disabling circuit which is operative when the headlights are off.

In FIG. 4, the parking light circuit 16 is added. This is consistent with later model cars which have separate switching and fusing for parking and headlights. Another pair of normally open contacts 18 is added to the relay for the parking light circuit. Diodes $D_1$ and $D_2$ allow either or both light power sources to provide relay power, and diodes $D_4$ and $D_5$ provide a holding path for current through $R_2$ from either source as well.

In addition, a longer time period output from the timer is used to turn on the shunting transistor $Q_2$. $D_8$ disables the headlight timer output from $U_1$, $Q_8$, when the headlights are off, as when only the parking lights have been turned on. Typically, the parking lights take less current, so the battery will last longer with the parking lights on than with the headlights on. In this example, the $Q_8$ output for the headlights turns on $Q_2$ about a minute after the ignition is turned off, and $Q_{14}$ turns on $Q_2$ after about an hour, thus providing up to an hour of parking light with the ignition off.

When the headlights are on, then $D_8$ is cut off and $Q_8$ is unhindered in turning on $Q_2$ (to de-energize the relay) one minute after turning off the ignition. But, with the headlights off, and parking lights on, there is no power applied to contact $S_4$ of the relay and the low resistance of the unlit headlights pulls the cathode of $D_8$ down to essentially ground potential, which shunts the current from $R_{14}$ away from the base-emitter junction of $Q_2$, whick keeps the relay closed after one minute headlight time.

The circuits shown thus far will theoretically work. But, practical considerations and limitations of various components require other parts for a reliable functional system. Those are shown on the complete schematic of FIG. 5, which also is described in detail.

Figure 5:
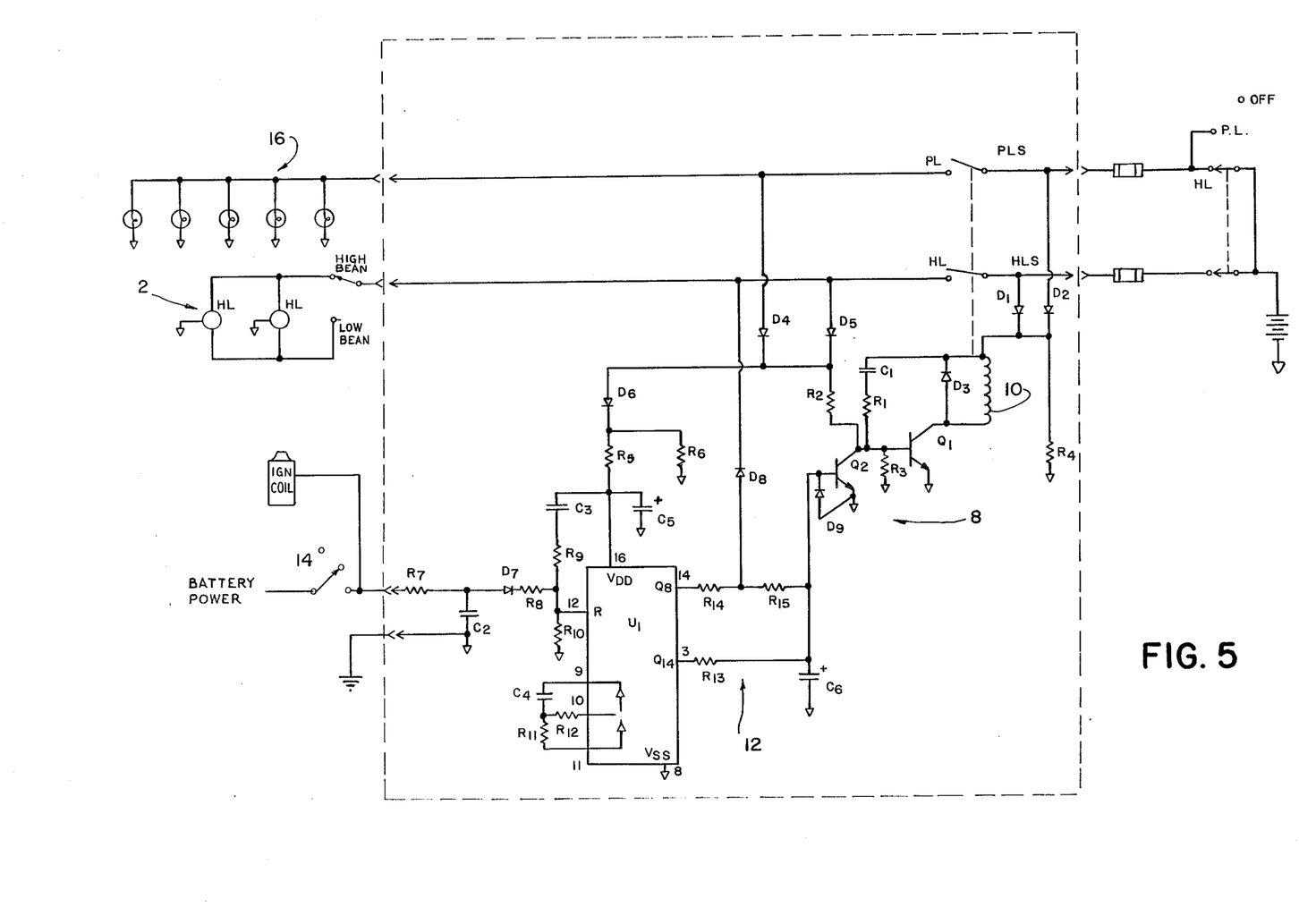
FIG. 5 is a detailed schematic description of the preferred embodiment of the present invention.

Reference identification numbers are the same as shown in the simpler diagrams. The added parts have other numbers. The function of the additional parts is as follows:

$D_3$ is the standard diode added across a relay or inductor to prevent very high peak voltages which would otherwise result when power is suddenly removed from the relay coil. $R_4$ discharges $C_1$ when $Q_1$ is off and after the headlight switch (the manual one in the car) is turned off.

When the manual switch is opened after a period when the relay was energized, then $C_1$ will have a charge. Conceivably when power is removed from the top of $C_1$ this charge will transmit a negative transient through the collector-base junction of $Q_2$ (which then acts as a diode) to $C_6$, which would then be opposite to the polarity shown for $C_6$, which is an electrolytic capacitor. Thus $D_9$ protects $C_6$ from this mild potential reverse bias hazard.

$C_6$ adds a time constant to the release signal to the relay so that the shunting action of $Q_2$ will not chatter the relay as it falls out.

The ignition switch signal is filtered by $R_7$, $C_2$ and $R_8$ so that spikes on the ignition line do not affect the sensitive reset input R of $U_1$. But, d.c. changes, such as the ignition being on or off, are easily sent through this network to the reset input R of $U_1$. In addition, diode $D_7$ allows for an additional reset from $R_9$ regardless of the state of the ignition switch. This additional reset is a transient through $C_3$ which occurs when the relay pull-in power is applied to either or both lighting circuits. This reset initializes the counter in $U_1$ to the all zero state, so that it will have to count through its prescribed sequence before an output can come from it to deenergize the relay. As long as the ignition is on, the counter in $U_1$ is always reset, and the lights stay on continuously.

Power is applied to $U_1$ to operate the integrated circuit through $D_6$ and $R_5$, with $C_5$ used as a bypass capacitor to filter out spikes that may come in on either of the light supply circuits. The purpose of $D_6$ is to prevent reverse current from flowing through the substrate of the integrated circuit from the ignition being on and to supply a positive signal to the reset input when $V_{DD}$ is not receiving a positive voltage through the relay. For the integrated circuit timer to function properly, it must have positive voltage applied to $V_{DD}$ (pin 16). Due to substrate diodes in the integrated circuit structure of $U_1$, applying a positive voltage to any input will tend to power $V_{DD}$ incorrectly. In this case, voltage could flow from the reset input R through the $V_{DD}$ connection to $R_2$ which would keep $Q_1$ biased on and the relay energized. $D_6$ prevents current from flowing out of $U_1$, $V_{DD}$ to $R_2$.

$C_4$, $R_{11}$ and $R_{12}$ establish the timer oscillator frequency, typically about 4 Hz.

While several devices have been developed to automatically shut off the headlights when the operator forgets them, all of these devices have drawbacks which have prevented them from being standard equipment that is to be desired by the majority of automobile drivers.

One of the major drawbacks has been that the device includes a second switch which is either in series or parallel with the existing light switch. The second switch is often a relay which adds to the cost and complexity besides reducing reliability and introducing a second contact voltage drop which is undesired with headlight switching.

Besides the additional switch that may be automatic, there is often included in the system another operator controlled switch which has to engage to get the benefit of the automatic system.

One embodiment of the present invention has a headlight switch similar to the existent manual ones except that it additionally has a means of physically resetting that same switch to the off position when some logic has determined that the operator has forgotten the headlights.

There are several types of headlight switches. The European ones typically turn or rotate; traditional American ones pull out to turn on; others push on and push off. The present invention automatically returns the switches to their off position by electro mechanical, electro pneumatic, electro hydraulic, electro chemical means or any combination of these methods of actuating mechanical movement in response to an electrical signal resulting from the headlights being left on for a period of time with the ignition turned off. All types of headlight switches can have such mechanisms designed into them for automatic resetting to the off position.

Since the headlight switch itself is being reset, virtually no thought need be given this feature by the operator. The device previously described in U.S. Pat. No. 4,301,390 also requires no additional operator thought about switches, except that since the physical switch is not returned to the off position, the operator has to recognize that if he forgets the lights, the switch will appear in the on position when he returns to the vehicle, even though the lights are off. With this embodiment of the present invention, the operator not only may forget the headlight switch when he departs the vehicle, but also he can remain totally ignorant of his ever having left them on, since the switch will be automatically reset to its normally off position before he returns.

In addition, since only one switch is used, there is less complexity and greater reliability and no more than normal voltage drop due to the switch. In addition to the simplicity provided by using just the one switching device, additional simplification results in the logic since the main switch is actually reset rather than a peripheral switch which requires additional logic to prevent the reactivation of the lights the next time the ignition is turned on.

Implementations are illustrated with a few examples. The invention is not limited to a particular detailed mechanical design; the invention provides the method of using a headlight switch with means of mechanically resetting it automatically.

The traditional hand pulled switch has three positions: all the way in for off, part way out for parking lights and all the way out for the headlight function.

In this type of switch, there are several sliding contacts which provided some slight friction against which the operator acts when he pulls the switch on. But, to ensure that the switch stays in the selected position, there is usually a detent mechanism which provides what amounts to a substantial amount of resistance to movement when in the detented position. Thus it takes some noticeable force to get it into the detented "on" position and a similar and noticeable force to return it to the off position.

In this embodiment of the present invention, there are several methods of including an automatic return to the action of the switch. Several of these methods are listed. Production costs and particular designs dictate which method is best for any given configuration of switch. Some preferred methods are as follows:

1. A switch has the normal detent removed so that the switch moves easier than normal by itself. A spring, unless restrained, always will return the switch to off. A separate holding mechanism is employed that is electrically operated to lock the switch in the detented "on" positions. When pulled into the on position, current flowing through the switch is used to energize a solenoid that provides friction or detenting action. Logic disrupts the solenoid power for the automatic shutoff.

2. A switch has normal detent action but in addition has a powerful and relatively long throw solenoid which simply receives a pulse of current when it determines that the switch is to be pulled back to the off position.

3. A variation of number 2 uses some form of electro mechanical actuator other than a solenoid. A small d.c. motor with worm drive or other torque amplifying arrangement is used to pull the switch back to off in a slower manner. Due to the mass production of motors at a very low cost, this has practical application. A slip clutch is provided in the drive so that the operator can totally control the switch if he desires. Alternatively, a clutch disengages the motor drive assembly except when the automatic turnoff operation is energized.

4. A normal switch has a rack of gear teeth attached to the operating rod. A solenoid of short throw is used to repeatedly jack the rod along until it rests in the off position. This is a slower method but one requiring less power from the solenoid.

5. The actuating mechanism may be other than purely electro mechanical. One returning mechanism is electro thermal mechanical. A heating element attached to a bi metal spring or other device exerts pressure after heating.

6. One embodiment has a normal switch with a pneumatically operated return mechanism. One embodiment of such mechanisms is a bellows with a liquid sealed within that boils at a moderate temperature and with heating element also inside to vaporize the liquid when return activation is to be accomplished. A friction drive is included here as in all designs where needed.

7. In a variation of the above, the actuation is done hydraulically. The method of developing hydraulic pressure is by heating of some fluid or by electrically driving a small and simple hydraulic pump. Some vehicles already use vacuum and coolant pressure differentials which may be used for the desired actuation.

8. One embodiment uses a switch with electro chemical means of actuation. One such means includes a simple electrolysis mechanism for turning water into its hydrogen and oxygen components and then igniting that combination in a bellows which provides the desired motion for shutoff.

9. In one embodiment, a holding mechanism uses a permanent magnet for detenting. A solenoid is actuated momentarily to act upon the magnetic circuit in such a manner as to temporarily disable the holding power of permanent magnet.

Figure 6:
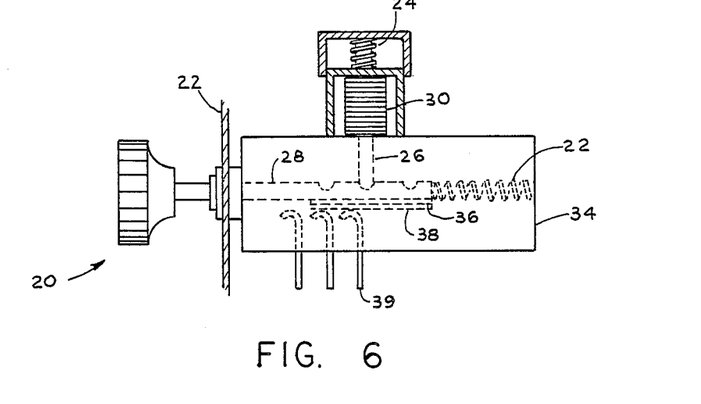
FIG. 6 is a detail of a headlight switch having one form of the invention.

10. In still another embodiment a detenting mechanism is in operation when electrically unenergized. A solenoid attached thereto is energized briefly to release the detenting for the automatic return to off. This is one of the most practical approaches, one form of which is shown in FIG. 6. For a short throw, a relay type of actuator may be used instead of a solenoid. A headlight switch is generally indicated by the numeral 20. Pull knob 21 extends from a dashboard 22. A spring 24 in compression keeps detent 26 against control rod 28.

Solenoid 30 is normally unenergized. A spring 22 in tension returns switch to off when solenoid 30 is energized, thus removing detent 26 from a notch in control rod 28. A switch body is generally indicated by the numeral 34. Insulating strip 36 separates switching bar 38 from control rod 28. All move together to selectively complete circuits through switch contacts 39.

Figure 8:
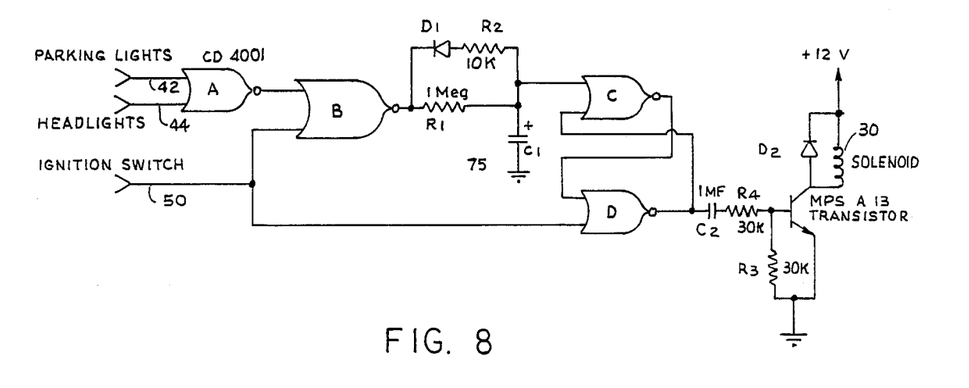
FIG. 8 is a schematic detail of a preferred logic circuit used with the headlight switch of FIG. 6.

A more practical circuit of the logic is shown in FIG. 8, using a standard quad CMOS NOR gate such as the industry standard CD4001 integrated circuit device and a few discrete components. Circuit description: When either parking lights or headlights are on, gate A produces a low output to one gate input of gate B. If ignition is off, then other gate of gate B is also low which causes output of gate B to be high which gradually charges $C_1$ towards a positive or logical "1" state. When the charge on $C_1$ becomes more positive than about half the total supply voltage, then gate C sees that as a logical "1", which causes gate C output to go low. This is applied to one input of gate D. The other input of gate D is from the ignition switch 50, which is also low, so that gate D output goes high and applies a second high to the gate C second input, thus locking its output low which in turn locks gate D output high. As gate D output goes high at the time the timer of 1 minute expires, it transmits a positive step to $C_2$ which pulses the transistors, driving the solenoid 30. The time constant of $C_2$ and R4 and R3 are relatively short, so that in effect a 100 msec pulse is produced which is long enough for the solenoid to disengage the switch and have it return to the normally off physical condition. Diode $D_2$ protects the transistor from the inductive spike generated by the solenoid 30.

Diode $D_1$ guarantees quick discharge of $C_1$ when the one minute timer is interrupted by someone realizing he forgot the lights, in which case he might turn off the headlight switch which would cause gate A to output a high logical "1" and gate B would output a low or logical "0" which would quickly discharge $C_1$ towards ground.

For reliable operation amidst the usual automobile transients there is included a decoupling network between each of the inputs from the car electrical system and the gate inputs and another on the battery supply to the integrated circuit supply input, not shown for simplicity sake. Typically, all of these would simply be a series resistor with capacitor shunting the gate input or power input to ground.

In addition to the switch and return mechanism, another essential part of the system is the logic that determines when to energize the automatic turning off mechanism. A pulse to the solenoid 30 is all that is necessary to release the switch rod so it can return to off. The logic typically senses when the ignition is on or off and when power is flowing through the switch, which would indicate it was in an on position. Then, the logic initiates a timer when the ignition is sensed to be off but the lights are on. After typically a minute, the timer calls for a pulse of power to solenoid 30 long enough to enable the control rod to return all the way to off.

The logic used is electronic logic using semiconductor logic elements of a discrete or integrated circuit nature. But, the logic is not limited to an electronic embodiment. An electro-mechanical device uses small relays with a timing means. For illustrative purposes, only the electronic type of logic is described. In addition to the logic inputs from the ignition and light switches, there also may be a third input from an external source such as a radio receiver, so that the operator could elect to leave the lights on until he was secure in his abode, whereupon he could immediately send a signal that would shut off the lights prior to the normal one minute timer.

Figure 7:
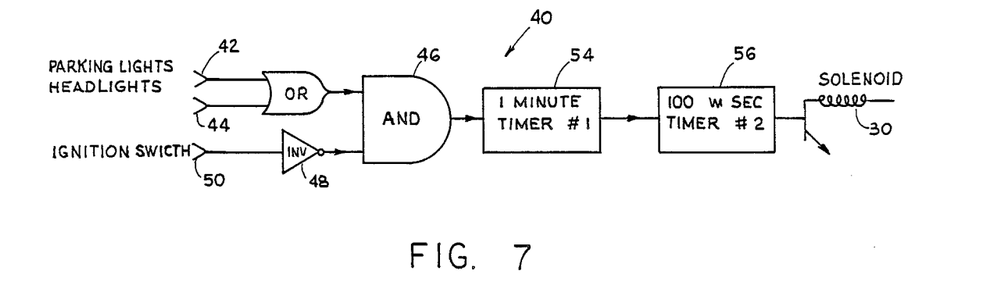
FIG. 7 is a schematic detail of a circuit used with the light switch of FIG. 6.

The logic could be mounted within the body of the switch, or it could be a separate module. A diagram of a possible logic configuration 40 is shown in FIG. 7, which illustrates the most basic logic. If either the parking lights 42 or headlights 44 are on, then a high output comes out of the OR gate 46, which equals logical "1". The inverter 48 inverts the switched side of the ignition switch 50 such that when the ignition is off, a high will be outputted from the inverter 48 which is also equal to a logical "1". Both of these signals go to an "And" gate 46, and when they are both high, or logical "1", then the And gate 46 produces a high output to enable the 1 minute timer 54. At the end of that 1 minute, it in turn enables the 100 msec timer 56, which pulses the solenoid 30 for 100 msec, returning the switch 20 to off. Thus, the high or "1" signal from the lights is removed and the And gate output goes low or to logical "zero" and the solenoid 30 remains unenergized and the lights are off.

Figure 9:
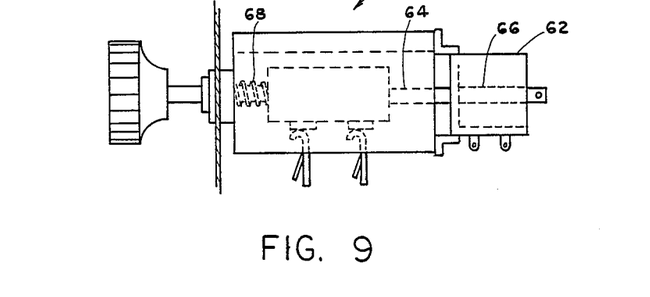
FIG. 9 is a detail of another form of headlight switch using the present invention.
Figure 9A:
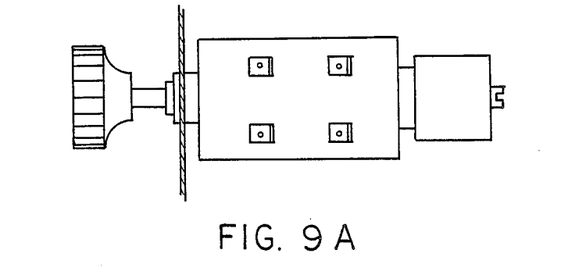
FIG. 9a is a bottom view of the headlight switch shown in FIG. 9.

FIGS. 9 and 9a show a basic switch mechanism 60 similar to most pull type headlight switches. A solenoid 62 is added at the back. Push rod 64 is attached to plunger 66, which holds the headlight switch in the fully extended position, or headlight "on" position, when power is applied to the solenoid 62. When power is removed from the solenoid, the spring 68 forces the push rod 64 back. Due to inertia rod 64 passes the parking position and winds up back at the off position.

Power to the solenoid 62 comes from the headlight switch contacts. When the operator pulls the switch out to the headlight position, which is the fully extended position, power is applied to the lights and the solenoid, which then pulls in to the seated position which is where the solenoid has the greatest pulling power. That pulling power pushes the rod extension going through the solenoid against the back of the headlight switch armature which easily holds it fully extended until power is removed from the solenoid.

Figure 10:
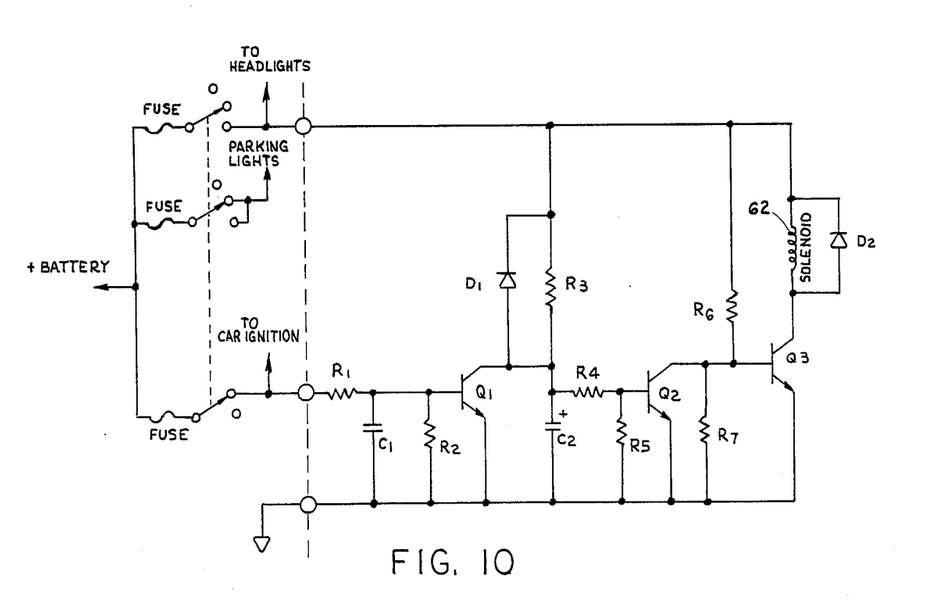
FIG. 10 is a schematic of a circuit for use with the headlight switch shown in FIG. 9.

The circuit in FIG. 10 shows that the return of the solenoid 62 goes through a transistor, Q3, which acts as a switch. Operation of the circuit is as follows:

C2 is normally discharged, which means the base of Q2 is at ground, which means that Q2 is cutoff, and therefore it allows Q3 to be turned on whenever the top of R6 receives power from the headlight switch being on. If the ignition is on, then Q1 is also on, which keeps C2 discharged indefinitely, so that Q3 keeps the solenoid holding the light switch on.

When the ignition is turned off, and the headlight switch is forgotten, then Q1 turns off, and C2 is slowly charged through R3. After typically one minute, C2 reaches a voltage that turns on Q2, which in turn shunts the bias applied to Q3 to ground, and Q3 shuts off, which cuts off current to the solenoid, and the switch returns to the off position. As soon as the switch opens, any remaining charge on C2 is quickly discharged through D1, and the headlights so that the switch is ready to be reactivated as soon as it has turned off.

The solenoid force is easily overcome by the operator, when he manually elects to shut off the headlight switch in the normal manner. The switch can be placed in the parking light position without it returning to off, since the spring is not fully compressed at that point.

Figure 11:
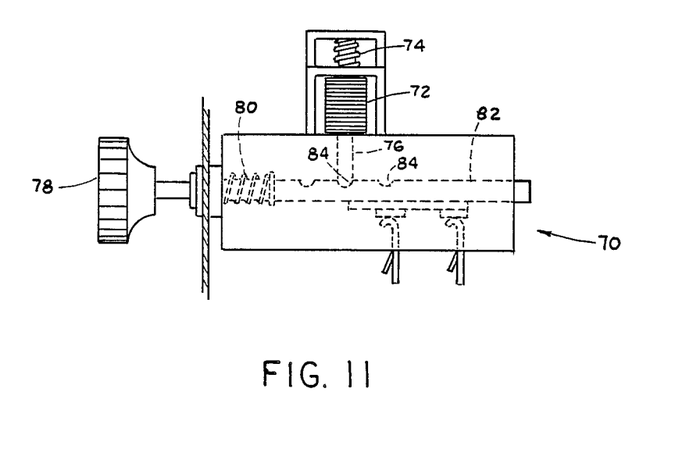
FIG. 11 is a detail of an alternate form of headlight switch.

A preferred embodiment of a switch 70 is shown in FIG. 11. With no power applied to the solenoid 72, the spring 74 on the detent 76 provides the normal locking points for the off, headlight on and parking light on positions. Each can be overridden by the operator mechanically which means it performs exactly like an ordinary pull switch with a pull knob 78. Except, that a compression spring 80 at the front forces the switch rod 82 back to the off position if the solenoid 72 is energized, thus releasing the detent 76 as it is pulled from notches 84 in the control rod 82.

Figure 12:
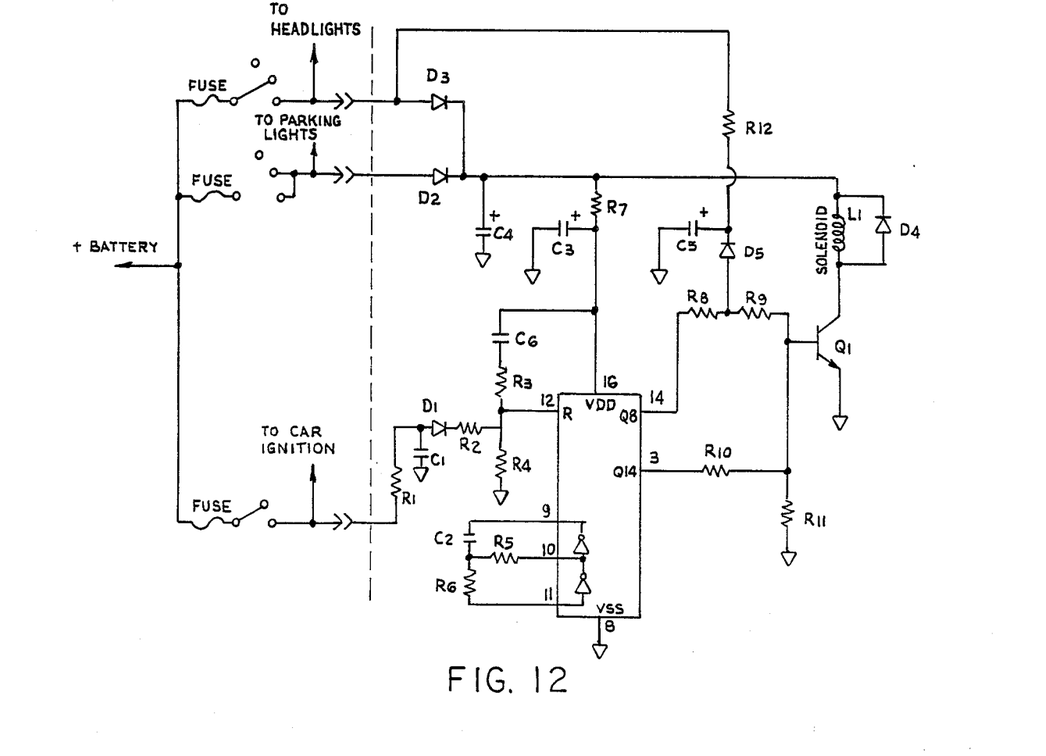
FIG. 12 is a circuit used for the headlight switch of FIG. 11.

The circuit shown in FIG. 12 uses the same CD4060 type of CMOS integrated circuit timer that is shown before on the systems shown in FIGS. 3-5. In this case, whenever either headlight or parking light power is turned on, C4 is charged almost immediately, and so is C3. C6 momentarily transmits a reset pulse to U1 so that Q8 and Q14 outputs are low, and the timer starts to run while Q1 is off. If the ignition is turned on, then it keeps pin 12 (the reset input) high which inhibits the timer, and Q1 stays off indefinitely or until some time period after the ignition is turned off. C2, R5 and R6 form the oscillator part of the timer. The timer contains a multi stage digital counter that counts many oscillations from the oscillator to determine the time before each of the Q outputs go high. It is set up so that Q8 goes high after about 1 minute and Q14 goes high after about 1 hour.

C4 is typically large, for example 1000 mfd, so that it holds sufficient charge to power the solenoid for 0.1 seconds after the headlight and parking light switches have opened, so that the control rod will surely be returned to off before power is removed from the detent releasing solenoid. C3 and R7 help to protect the integrated circuit from spikes and noise on the switched lines. R1, C1, R2 and D1 transmit the ignition "on" information to the timer, without transmitting any possible noise on that line. Those parts filter out the ignition noise.

If the headlights are forgotten, then one minute after turning off the ignition, Q8 goes high, which turns on Q1 through R8 and R9, which pulls in the solenoid, and the detent is released, causing the switch to go all the way to off before C4 is discharged. Since the switch has returned to off, the circuit remains dead until the operator turns it on again. C5 keeps D5 back biased for an instant when the switch is moving off of the headlight "on" position so that the solenoid will be kept on during the travel of the control rod. With parking lights only on, D5 keeps Q8 from activating Q1. Thus Q1 will not turn on until 1 hour after turning off the ignition, whereupon Q14 output turns on Q1 and the switch again moves to the off position.

While the invention has been described with reference to specific embodiments, modifications and variations of the invention may be constructed without departing from the scope of the invention. The scope of the invention is defined in the following claims.

I claim:

1. An automatic headlight switching apparatus comprising normally open contacts which are in series between a headlight and existing switch on a switched side of a headlight switch, energizing means for closing the normally open contacts by the operator's actuation of the headlight switch to an "on" condition from an "off" condition, means to maintain the "on" condition, disabling means electrically connected to the energizing means for disabling the energizing means and controlling means for controlling the disabling means.

2. The apparatus of claim 1 wherein the disabling means comprises an operator induced means or a timer induced means for disabling the energizing means.

3. The apparatus of claim 2 wherein the disabling means comprises a grounding means connected to the timer for bypassing a part of the energizing means.

4. The apparatus of claim 1 wherein the energizing means comprises a transistor connected in series to a relay for completing a power circuit from a first contact, a capacitor and resistors connected parallel to the relay, and to the transistor for biasing the transistor on.

5. The apparatus of claim 4 wherein a energizing circuit comprises resistors connected between a second contact and ground and connected to a base of the transistor for biasing the transistor on.

6. The apparatus of claim 5 wherein the disabling means comprises a second transistor having power terminals connected to a base of the first transistor and to ground for disabling the on biasing of the first transistor.

7. The apparatus of claim 6 wherein the disabling means further comprises a timer having an output connected to a base of the second transistor for biasing the second transistor on when the output reaches a high level.

8. The apparatus of claim 7 wherein the timer comprises an input, an oscillator connected to the input, and an accumulator for changing the output from a low state to a high state upon accumulating a number of oscillations.

9. The apparatus of claim 8 further comprising a parking light circuit, a second set of normally open contacts in the parking light circuit, means for closing the second set of contacts connected to the relay of a second contact, a first connection from a first contact in the second set to an energizing circuit, a second connection from the second contact to the energizing circuit, a second timer means connected to the disabling means for disabling the energizing means after a predetermined time, and first timer disabling means connected to a first timer output and to the headlight circuit for disabling the first timer output.

10. The apparatus of claim 9 wherein a first timer means produces a high output about one minute after the oscillator begins and wherein the second timer output means becomes high about one hour after the oscillator begins.

11. The apparatus of claim 9 wherein a second disabling means comprises a circuit having a diode connected between the output of the first timer means and the headlights for grounding the output of the first timer means through relatively low resistance of the headlights in the off condition.

12. The apparatus of claim 9 further comprising diodes in the first and second connections and diodes in the energizing circuit cooperating with the diodes in the first and second connections for preventing current flow between the headlight circuit and the parking light circuit.

13. The apparatus of claim 1 further comprising a parking light circuit and parking lights connected to the parking light circuit, a second set of normally open relay contacts connected in the parking light circuit and means for closing the contacts connected to a relay, a first connection connected to a first contact of the second set and a second connection connected to the second contact in the second set and to the energizing circuit for providing power to the energizing circuit when the parking light circuit is energized and means for preventing flow of current between the parking light circuit and the headlight circuit.

14. The apparatus of claim 13 further comprising a second timer means connected to the disabling means and means for disabling a first timer output when the headlight circuit is not energized.

15. An automatic headlight switching method comprising closing normally open contacts which are in series between a headlight and existing switch on a switched side of a headlight switch with a relay, controlling the relay from one of the contacts and energizing the relay and closing the contacts and a second controlling of the relay from the other of said contacts, energizing the relay and maintaining the contacts closed when power is supplied to the other of said contacts, timing the second controlling with a timer, and disabling the second controlling after a time interval.

16. The method of claim 15 wherein a first controlling step comprises completing a power circuit from a first contact through a transistor and biasing the transistor on with a capacitor and resistors connected parallel to the relay and to the transistor.

17. The method of claim 16 wherein a second controlling step comprises biasing the transistor on with resistors connected between a second contact and ground and connected to a base of the transistor.

18. The method of claim 17 wherein the disabling means comprises disabling the on-biasing of the first-mentioned transistor with a second transistor having power terminals connected to a base of the first-mentioned transistor and to ground.

19. The method of claim 15 further comprising controlling a parking light circuit by closing a second set of normally open contacts in the parking light circuit with the relay by supplying power from a first contact in the second set for a first controlling and supplying power from a second contact for the second controlling step with a second timer disabling the second controlling after a predetermined time, and conducting output of a first timer through the headlight circuit thereby disabling the first timer output.

20. A method of switching headlights comprising supplying power to a relay energizing circuit upon closing of a headlight switch, charging a capacitor and creating a control voltage and completing a relay energizing circuit from a first contact, the capacitor and resistors connected in parallel to a relay and to a transistor for biasing the transistor on, and closing normally open contacts which are in series between a headlight and existing switch on a switched side of a headlight switch with a relay.

21. The method of claim 20 further comprises controlling the relay energizing circuit with current from the headlight circuit between the closed normally open contacts and the headlights.

22. The method of claim 21 further comprises disabling the controlling of the relay and interrupting a circuit through the relay, thereby releasing the relay and opening the normally open contacts.

23. The method of claim 22 further comprising controlling the disabling of the controlling of the relay with an output of a timer.

24. The method of claim 23 further comprising starting the timer when an ignition switch is turned off.

25. The method of claim 24 wherein the timer is operated with current from the headlight circuit.

26. The method of claim 25 further comprising closing normally open contacts in a parking light circuit with a relay, by energizing the relay from connections to the headlight and a parking light circuit between the headlight and parking light switches and the contacts, and controlling the relay energizing circuit with connections to the headlight circuit and to the parking light circuit between the normally open contacts and the lights.

27. The method of claim 26 further comprising starting a second timer means when the ignition switch is off, and wherein the disabling comprises disabling the energizing of the relay and interrupting the relay circuit with outputs from a first and second timer.

28. The method of claim 27 further comprising disabling of the first timer means when the headlights are off.

29. The method of claim 28 wherein disabling the first timer means comprises connecting output of the first timer means to the headlight circuit and thus grounding the output of the first timer means through low resistance of the headlights in an off position.

* * * * *